July 2, 1929.   N. L. GULLIFORD   1,719,804
MACHINE FOR USE IN MAKING WOOD HEELS
Filed March 19, 1925    3 Sheets-Sheet 1
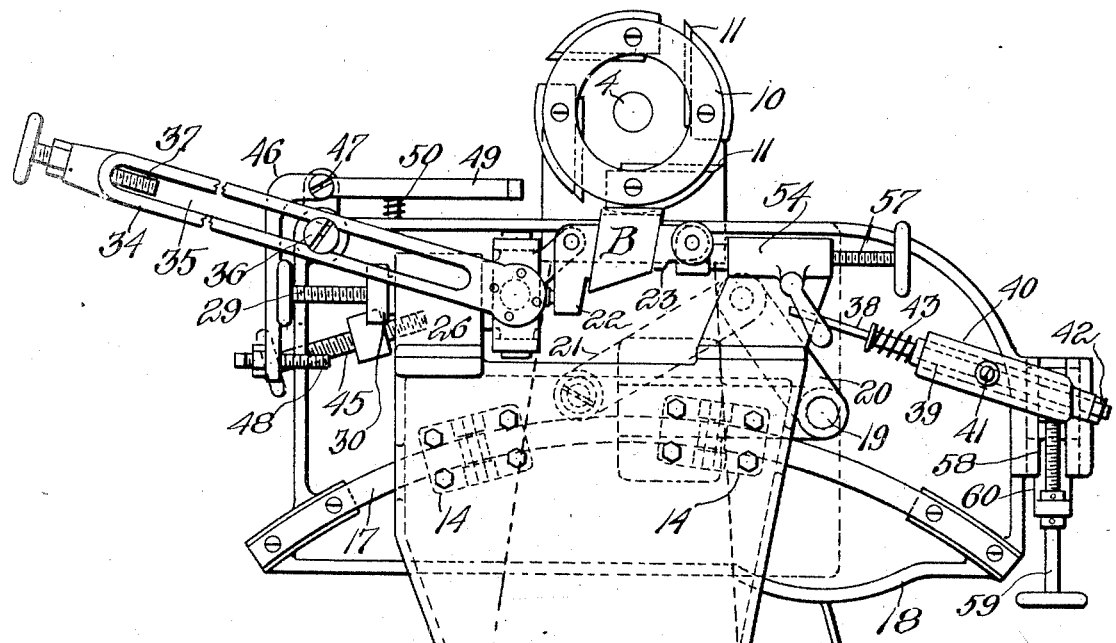
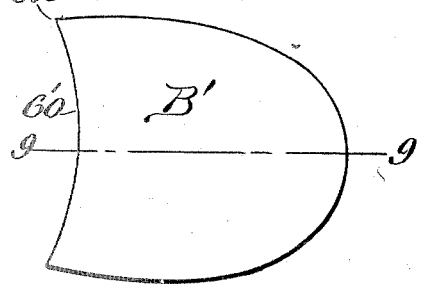
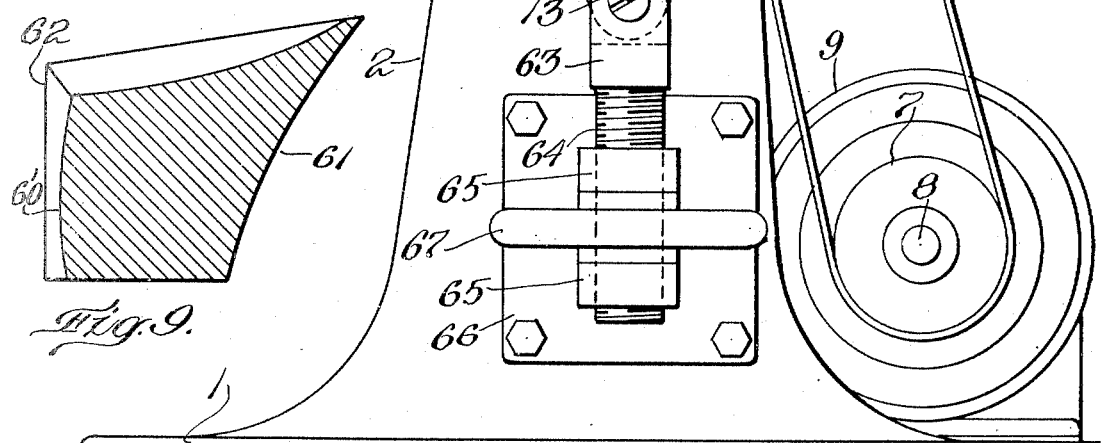

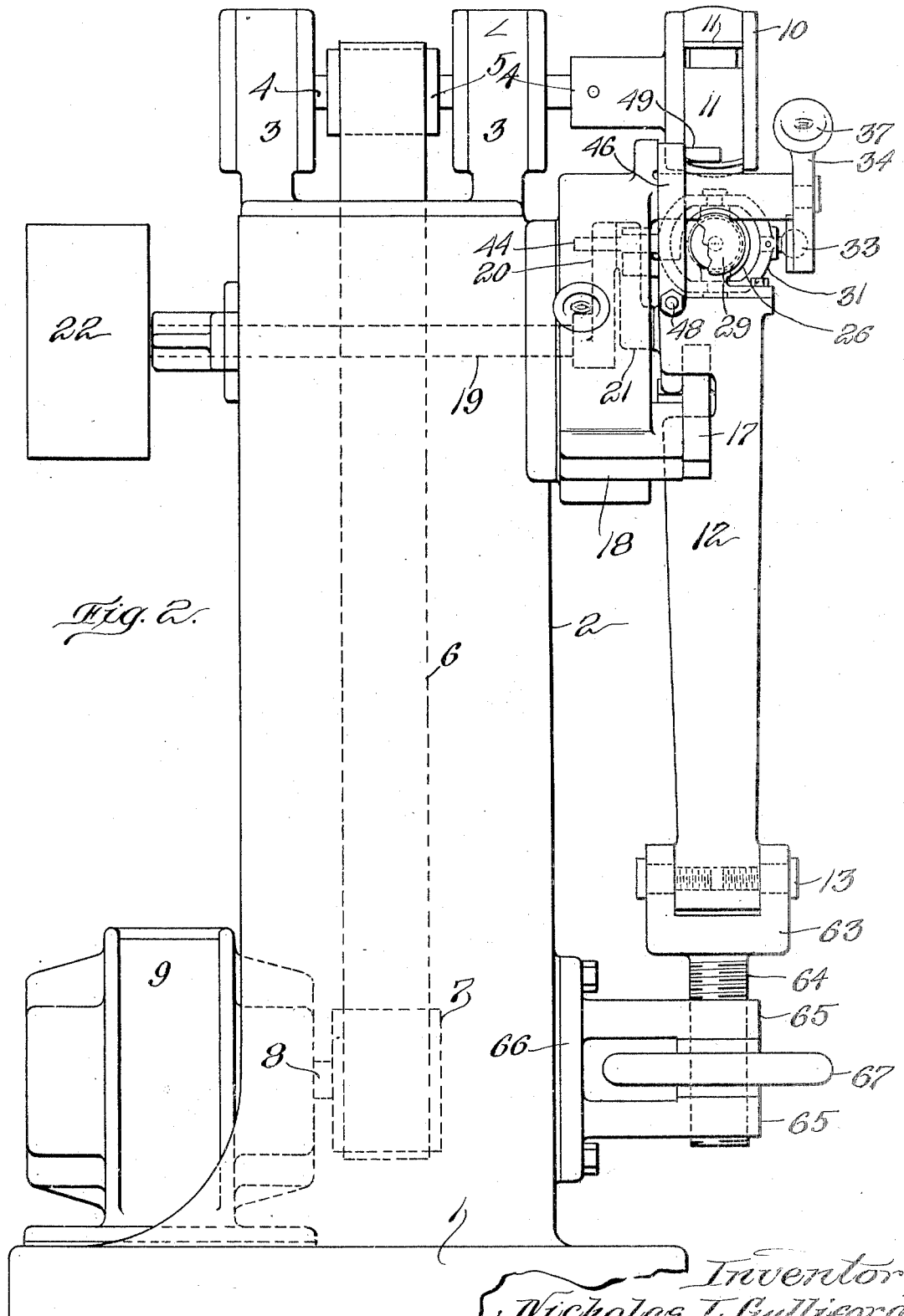

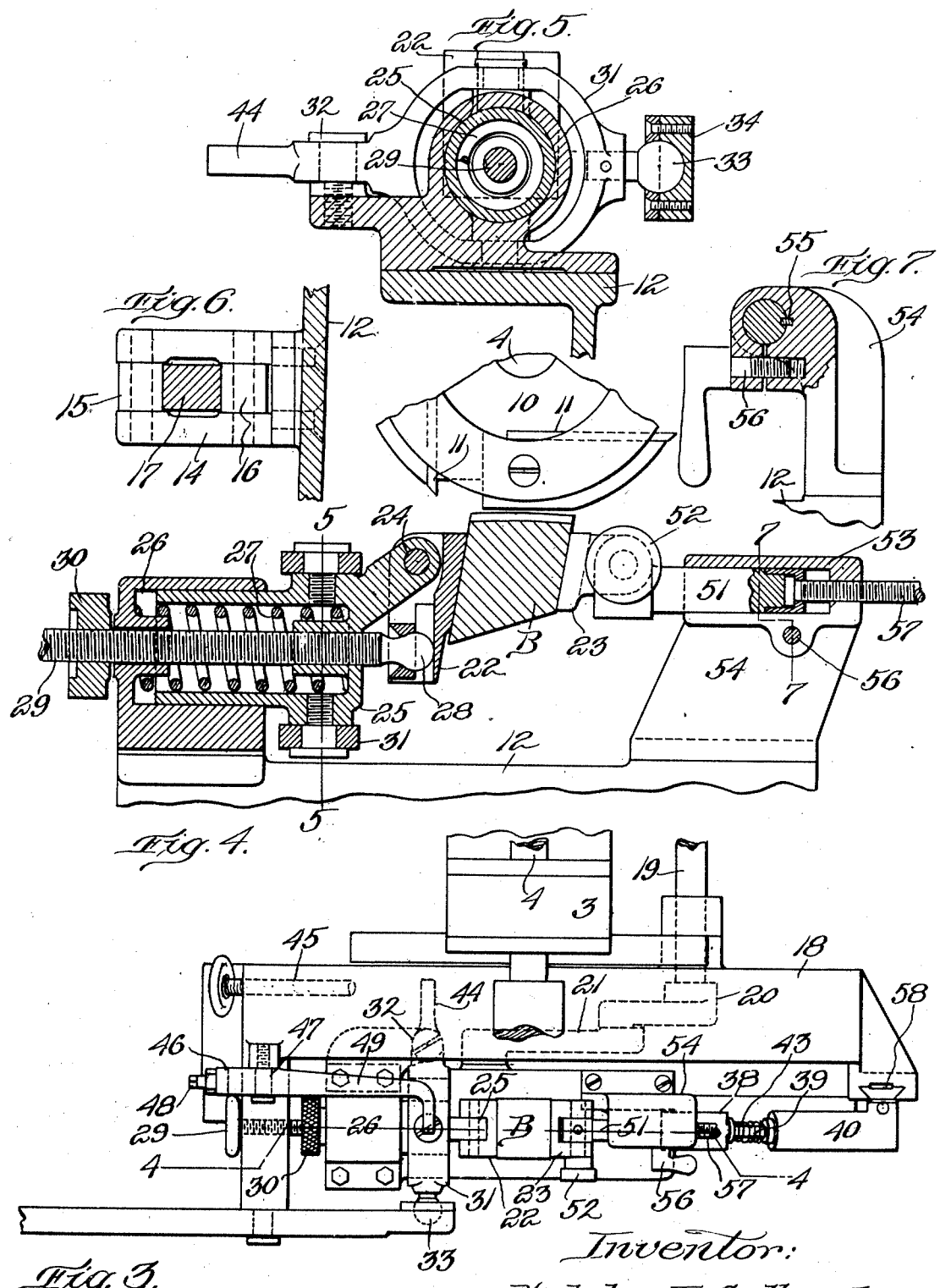

Patented July 2, 1929.

1,719,804

UNITED STATES PATENT OFFICE.

NICHOLAS L. GULLIFORD, OF PEABODY, MASSACHUSETTS, ASSIGNOR TO GREGORY & READ COMPANY, OF BOSTON, MASSACHUSETTS, A CORPORATION OF MASSACHUSETTS.

MACHINE FOR USE IN MAKING WOOD HEELS.

Application filed March 19, 1925. Serial No. 16,596.

My invention relates to machines for use in making wood heels and particularly to machines of this class which are employed to form the breast portion of the heel.

Wood heels such as are commonly employed on women's shoes, particularly those styles known as Cuban, military, etc., are formed each with a transversely concaved breast that is produced by means of a cylindrical saw called a "barrel" saw. An objection to this method of making wood heels was that the saw, moving transversely across the breast of the heel, would leave the surface of the latter scored and disfigured. Another objection was that a Cuban or like heel having a transversely curved breast and concaved exterior surfaces at its sides and back, could not heretofore be produced with straight corners at each side of the breast, but the shape of these corners at the junction of the concaved side and breast surfaces, would be a composite curve produced by the intersection of the breast and side surfaces.

My invention has for its object to provide a machine for use in making wood heels of the class indicated by means of which wood heels of said class may be produced having smoothly finished breast surfaces and straight, or practically straight, corners at each side of the breast.

To these ends I have provided a new machine for use in making wood heels, said machine having the peculiar features of construction and mode of operation set forth in the following description, and the novel features thereof being particularly pointed out and defined in the claims at the close of the description.

In the accompanying drawings:

Figure 1 is a front elevation of my new machine, for use in making wood heels.

Figure 2 is a side elevation of the machine shown in Fig. 1.

Figure 3 is a plan view of a portion of the machine shown in Figs. 1 and 2.

Figure 4 is a section on line 4—4 of Fig. 3.
Figure 5 is a section on line 5—5 of Fig. 4.
Figure 6 is a detail hereinafter described.
Figure 7 is a section on line 7—7 of Fig. 4.
Figure 8 is a top plan view of a wood heel produced by my machine. Figure 9 is a section on line 9—9 of Fig. 8.

The embodiment of my invention herein shown includes a frame comprising a base 1 supporting an upstanding pillar or column 2 provided at its upper end with bearings 3, 3 for a horizontal shaft 4. Shaft 4 carries a pulley 5 connected by a belt 6 with a pulley 7 fast on the armature shaft 8 of an electric motor 9, the latter being mounted upon the base 1. At its front end the shaft 4 has fast on it a cutter head 10 carrying tangentially disposed blades 11 whose outer cutting edges are arcuate or curved and disposed lengthwise of the axis of shaft 4 so that when the cutter head is in action it forms a transversely curved groove in the work.

Wood heels of a given size and style are produced, commercially, from wooden blanks of uniform size and shape by several different operations including shaping the breast, turning, grading, concaving and shank shaping, and my new machine is for use in performing the first of these operations.

The machine includes a work holder comprising a carriage 12 pivotally supported at 13 to swing cross-wise of the axis of cutter 10, said carriage being made upon its inner side with two brackets 14, 14, (Figs. 1 and 6) carrying rollers 15 and 16 engaging opposite sides of rail 17 to prevent movement, or displacement, of carriage 12 otherwise than on its pivot 13. The rail 17 is fastened at its ends to a bracket 18 rigidly secured to the column 2 and forming part of the framework of the machine.

Journaled in bearings on the frame of the machine is a shaft 19 whose forward end carries an arm 20 connected by a link 21 with the carriage 12. At its rear end shaft 19 carries a pulley 22 that is continuously driven at a relatively slow speed by a driving belt (not shown). Thus, during the operation of the machine the carriage 12 is slowly vibrated on pivot 13 by the rotating arm 20, so that two work-holding jaws 22 and 23 are carried back and forth past the cutter head 10, from a position at one side thereof to a position at the opposite side thereof.

The work-holding jaw 22 is pivotally connected at 24 to a tubular slide 25 movably mounted within a socket 26 provided on carriage 12. A spring 27 within slide 25 serves to yieldingly urge the latter and jaw 22, toward the jaw 23. The lower end of jaw 22 is connected by a ball and socket joint 28 with one end of a screw 29 which extends through and engages a threaded aperture provided in the end wall of slide 25, and which also extends loosely through an unthreaded aperture provided through the end wall of socket 26. A thumb nut 30 adjustably mounted upon screw 29 engages the outside of the end wall of socket 26 to limit the movement of jaw 22 toward jaw 23 under the influence of spring 27 when there is no work in position between the jaws.

The slide 25 is embraced by, and pivotally connected with, a yoke lever 31 fulcrumed at 32, Fig. 3, on carriage 12. At its outer end lever 31 is pivotally connected by a ball and socket joint 33 with one end of a link 34 formed with a longitudinal slot 35, Fig. 1, that is occupied by a stud 36 projecting from the bracket 18. At its outer free end the link 34 is provided with an adjustable screw 37 to co-operate with the stud 36. As, during the operation of the machine, the carriage 12 nears the limit of its movement toward the right, Fig. 1, the screw 37 engages the stud 36 and the latter then acts through link 34 to arrest the movement of slide 25 with the carriage 12, and as the movement of the latter continues the two jaws 22 and 23 are moved apart to permit of the entrance between them of a wood heel blank. As the two jaws are thus moved apart they arrive in position immediately above a gauge abutment 38 in the form of a plate and made with a stem 39 slidably mounted within a bearing provided in a bracket 40. The stem 39 is free to move endwise in bracket 40 but is held against rotation therein by a screw 41. The outer end of stem 39 is threaded to receive upon it a stop nut 42 that is normally held against the bracket 40 by a spring 43. Thus, as the carriage 12 nears the limit of its movement toward the right, Fig. 1, and the jaws arrive in position above the abutment gauge 38, the lower portion of jaw 22 may, with some conditions of adjustment, engage the end of the gauge, in which case the latter, as will be clear, is free to yield endwise and at the same time maintain its operative position with relation to the jaws. During the momentary dwell of the carriage 12 at the limit of its movement toward the right the operator places a heel blank B in position between the jaws 22 and 23 with its breast end uppermost and its back end resting against the gauge abutment 38.

As the carriage 12 starts upon its movement toward the left the screw 37 moves out of contact with stud 36 thus allowing spring 27 to set the jaw 22 against the heel blank and clamp the latter against the fixed jaw 23 so that as the heel blank is carried past the cutter head 10 it is held securely between the two jaws and the cutters form an arcuate groove across the upper end thereof.

After the blank B passes cutter head 10 and as the carriage 12 nears the limit of its movement toward the left, Figs. 1 and 3, an arm 44 forming part of lever 31, engages an adjustable abutment screw 45 which acts through said lever 31 to retract jaw 22 thereby freeing the blank B. At this moment the heel blank occupies a position immediately in the path of one arm 49 of a bell crank lever 46 fulcrumed at 47 on bracket 18. The other arm of this bell crank lever 46 extends downwardly and carries an adjustable abutment screw 48 which, at this time, is engaged by the side of carriage 12 so that the overhanging horizontal arm 49 of bell crank 46 is thrown downward against the freed heel blank to kick the latter downwardly out of position between the jaws. A spring 50 normally supports the arm 49 in a position above the path of the heel blank.

The jaw 23 is fixed rigidly to the end of a stem 51, but with provision for angular adjustment, by means of a screw 52. The screw 29, before referred to, provides for angular adjustment of jaw 22 and, together with its nut 30, serves to limit the inward movement of said jaw under the influence of spring 27 when there is no heel blank in position between the jaws. Thus the two jaws 22 and 23 may be set with their work-engaging faces parallel and disposed so as to present the wooden blank properly to the cutter head.

The stem 51 of jaw 23 is mounted within a socket 53 provided in a bracket 54 forming part of the carriage 12 and is held against rotation therein by a spline 55. The socket 53 is split as shown in Figs. 4 and 7 and is contracted upon the stem 51 so as to rigidly support the latter, by means of a screw 56. To the inner end of stem 51 is swivelly connected the end of a screw 57 which extends through and engages a threaded hole provided in the end wall of socket 53. Thus when screw 56 is loosened the stem 51 may be adjusted endwise in socket 53 by rotating screw 57.

The gauge supporting bracket 40 is slidably mounted in vertical ways 58 provided on bracket 18 and is held in position therein with provision for vertical adjustment by means of a screw 59 rotatably supported by an arm 60 projecting from frame 18.

Each of the screws 59, 57, 45 and 29 is provided with a hand wheel by which it is operated.

The arcuate groove 60', Fig. 8, formed across the breast end of the wood blank is concentric with the axis of the pivot 13, Fig. 1, and extends from the top side of the blank to the tread side thereof, when the blank is subsequently subjected to the turning operation and the back and sides of the heel are shaped and made concaved as at 61, Fig. 9, the corners 62 at each side of the breast will be straight or substantially straight and not inwardly curved as heretofore. Furthermore, it is customary to cut out the wood blanks B so that the grain of the wood is perpendicular to the breast end of the same. Therefore, the cutter head 10, acts upon the wood blank crosswise of its grain and consequently a smooth surface is produced by the cutter head.

The pivot 13 of carriage 12 is a pintle carried by a yoke 63 having a threaded stem 64 extending through arms 65 of a bracket 66 secured to column 2. A nut 67 mounted upon the threaded stem 64 between the arms 65 supports the stem 64 with provision for vertical adjustment.

What I claim is:

1. A machine for shaping the breasts of wood heels comprising a rotatable cutter head having a grooving cutting edge at its periphery disposed lengthwise of its axis; a work holding carriage movable back and forth in an arcuate path relatively to said cutter head, said carriage being provided with mechanism for holding a wood heel blank comprising a movable clamping jaw; automatic means for operating said movable jaw to permit a blank to be presented to said holding mechanism as said carriage nears the limit of its movement in one direction; automatic means for operating said movable jaw to cause it to clamp the blank in position on the carriage after the blank has been presented to said holding mechanism, and automatic means for operating said movable jaw to free the blank as the carriage nears the limit of its movement in the opposite direction and after the blank has been operated upon by said cutter head, there being an unobstructed path down which the finished heel falls by gravity when released by said holding means.

2. A machine for shaping the breasts of wood heels constructed in accordance with claim 1 and wherein automatic means is also provided for ejecting the finished blank from said holding mechanism when said movable jaw is operated to free said blank.

3. A machine for shaping the breasts of wood heels comprising a rotatable cutter head having a grooving cutting edge at its periphery disposed lengthwise of its axis; a pivotally supported work holding carriage movable back and forth in an arcuate path relatively to said cutter head, said carriage being provided with mechanism for holding a wood heel blank comprising a movable clamping jaw; automatic means for operating said movable jaw to permit a blank to be presented to said holding mechanism as said carriage nears the limit of its movement in one direction; automatic means for operating said movable jaw to cause it to clamp the blank in position on the carriage as the latter starts upon its movement in the opposite direction, automatic means for operating said movable jaw to free the blank as the carriage nears the limit of its movement in the opposite direction and after the blank has been operated upon by said cutter head, and means for continuously vibrating said carriage, there being an unobstructed path down which the finished heel falls by gravity when released by said holding means.

4. A machine for shaping the breasts of wood heels constructed in accordance with claim 1 and wherein is also provided a blank supporting gauge for positioning the blank when the latter is presented to said holding mechanism.

5. A machine for shaping the breasts of wood heels constructed in accordance with claim 1 and wherein is also provided a gauge for positioning the blank when the latter is presented to said holding mechanism, and a stationary support for said gauge.

6. A machine for shaping the breasts of wood heels constructed in accordance with claim 1 and wherein is also provided automatic means for operating said carriage and limiting its movement in both directions.

NICHOLAS L. GULLIFORD.